United States Patent [19]

Howard et al.

[11] Patent Number: 4,632,883

[45] Date of Patent: Dec. 30, 1986

[54] VERTICAL RECORDING MEDIUM WITH IMPROVED PERPENDICULAR MAGNETIC ANISOTROPY DUE TO INFLUENCE OF BETA-TANTALUM UNDERLAYER

[75] Inventors: James K. Howard, Morgan Hill; Mohammad T. Moshref, San Jose, both of Calif.

[73] Assignee: International Business Machines Corporation, Armonk, N.Y.

[21] Appl. No.: 725,977

[22] Filed: Apr. 22, 1985

[51] Int. Cl.$^4$ .............................................. H01F 10/30
[52] U.S. Cl. ..................................... 428/611; 428/660; 428/666; 428/667; 428/668; 428/680; 428/681; 428/694; 428/900; 428/928
[58] Field of Search ............... 428/900, 694, 611, 660, 428/666, 667, 668, 680, 681, 928

[56] References Cited

U.S. PATENT DOCUMENTS

| | | | |
|---|---|---|---|
| 3,515,606 | 6/1970 | Crowther | 428/928 |
| 3,520,664 | 7/1970 | York | 428/928 |
| 4,079,169 | 3/1978 | Nigh et al. | 428/928 |
| 4,245,008 | 1/1981 | Michaelsen et al. | 428/928 |
| 4,277,809 | 7/1981 | Fisher et al. | 428/900 |
| 4,410,603 | 10/1983 | Yamamori et al. | 428/611 |
| 4,411,963 | 10/1983 | Aine | 428/928 |
| 4,552,820 | 11/1985 | Lin et al. | 428/611 |
| 4,576,700 | 3/1986 | Kadokura et al. | 428/694 |

FOREIGN PATENT DOCUMENTS

| | | |
|---|---|---|
| 0093838 | 2/1983 | European Pat. Off. . |
| 56034-141 | 8/1979 | Japan . |
| 59077620 | 10/1982 | Japan . |

OTHER PUBLICATIONS

"High Density Perpendicular Magnetic Recording on Rigid Disks", Fujitsu Sci. Tech. J., 19, 1, pp. 99–126, Mar. 1983.

"Recording on Perpendicular Anisotropy Media With Ring Heads", IEEE Transactions On Magnetics, vol. Mag-17, No. 6, Nov. 1981, pp. 2547-2549.

*Tantalum Thin Films*, W. D. Westwood, et al., Academic Press (1975), pp. 76-88.

"The Growth Characteristics of Ion–Beam Sputtered CoCr Films on Ta Isolation Layers", IEEE Transactions on Magnetics, vol. Mag-20, No. 5, Sep. 1984.

*Primary Examiner*—George F. Lesmes
*Assistant Examiner*—William M. Atkinson
*Attorney, Agent, or Firm*—Thomas R. Berthold

[57] ABSTRACT

A thin film alloy disk for vertical magnetic recording has a cobalt-chromium-tantalum (CoCrTa) magnetic layer with perpendicular magnetic anisotropy deposited on an underlayer of beta-tantalum ($\beta$-Ta). The $\beta$-Ta layer is deposited on a suitable substrate, such as silicon, which is compatible with the formation of the beta phase of tantalum. The highly preferred orientation of the $\beta$-Ta film on the substrate and the incorporation of Ta in the magnetic film results in the magnetic film having improved perpendicular magnetic anisotropy, high perpendicular coercivity and low horizontal coercivity. A nickel-iron (NiFe) layer may be deposited between the substrate and the $\beta$-Ta underlayer to provide a magnetic flux return path.

6 Claims, 5 Drawing Figures

M-H LOOP FOR 500 A°$\beta$-Ta UNDERLAYER/
5000 A° $(Co_{85}Cr_{15})_{90}Ta_{10}$ MAGNETIC LAYER

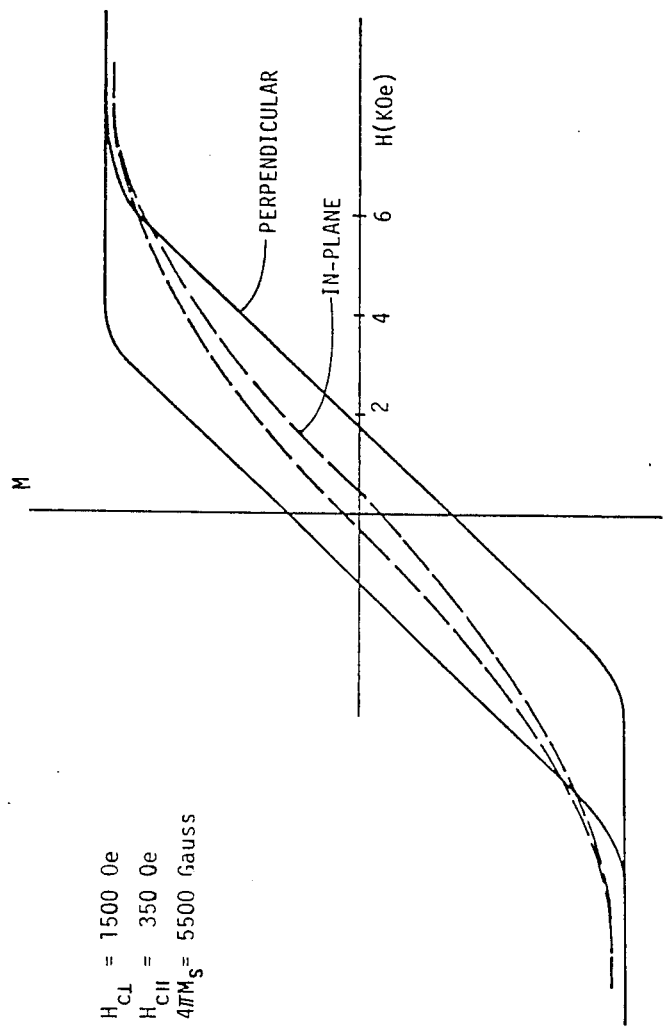

VERTICAL RECORDING MEDIUM WITH IMPROVED PERPENDICULAR MAGNETIC ANISOTROPY DUE TO INFLUENCE OF BETA-TANTALUM UNDERLAYER

TECHNICAL FIELD

This invention relates to vertical magnetic recording media and in particular to a thin film alloy recording disk having a magnetic layer with improved perpendicular magnetic anisotropy.

BACKGROUND OF THE INVENTION

Thin film alloy disks for vertical magnetic recording typically comprise a substrate, a magnetic or nonmagnetic underlayer and a magnetic layer having an ordered crystalline formation with its easy axis of magnetization oriented generally perpendicular to the substrate. One type of material used as the magnetic layer is a cobalt-chromium (CoCr) alloy which is sputter-deposited to form a film having a hexagonal close packed (hcp) crystalline structure with the [00.2] axis (the C-axis) oriented perpendicular to the disk substrate.

The magnetic properties of thin film alloy disks made with various substrates, a titanium underlayer and a CoCr perpendicular magnetic layer are described by Kobayashi, et al. in "High Density Perpendicular Magnetic Recording on Rigid Disks", *Fujitsu Scientific and Technical Journal*, Vol. 19, No. 1, pp. 99–126, March, 1983. That article discloses that substantially improved perpendicular magnetic anisotropy of the CoCr film is achieved with the use of a titanium (Ti) underlayer, and suggests that the C-axis orientation of the CoCr film is improved because the titanium underlayer isolates the influence of the substrate from the CoCr film. The CoCr magnetic films described by Kobayashi, et al showed a C-axis dispersion, as measured by the half value width, $\Delta\theta_{50}$, of an x-ray reflection rocking curve, of between 7° and 9°; a perpendicular coercive force, $H_{c\perp}$, of 475 Oersted (Oe); and a horizonal coercive force $H_{c\parallel}$ of 312 Oe. The Kobayashi article also discloses a nickel-iron (NiFe) soft magnetic layer between the substrate and the titanium underlayer to provide a magnetic flux return path.

A thin film alloy disk having a nonmagnetic cobalt-tantalum (CoTa) alloy as an underlayer for a CoCr perpendicular magnetic layer is disclosed in Japanese published unexamined patent application 59-77620 assigned to Suwa Seikosha Co., Ltd.

Published European Patent application No. 93838 assigned to Teijin, Ltd. discloses a disk for vertical magnetic recording having a soft magnetic underlayer of an amorphous CoTa alloy and a magnetic layer of CoCr with perpendicular magnetic anisotropy. This reference also discloses the addition of tantalum to provide a ternary alloy of CoCrTa as the magnetic layer over the CoTa amorphous magnetic underlayer.

The magnetic properties of a vertical recording disk with an 8000 Angstrom CoCrTa magnetic layer deposited on a 1000 Angstrom Cr underlayer are described by Langland and Albert in "Recording on Perpendicular Anisotropy Media with Ring Heads", *IEEE Transactions on Magnetics*, Vol. MAG-17, No. 6, November, 1981, pp. 2547–2549.

SUMMARY OF THE INVENTION

The invention is an improved disk for vertical magnetic recording and comprises a substrate of a material which is compatible with the formation of a phase of tantalum known in the art as beta tantalum ($\beta$-Ta), an underlayer of a $\beta$-Ta film deposited on the substrate and a film of a CoCrTa alloy deposited on the $\beta$-Ta underlayer to form an hcp crystalline structure having its C-axis oriented perpendicular to the substrate. In other embodiments, films of NiFe to provide a magnetic flux return path are incorporated between the substrate and the $\beta$-Ta underlayer, or between an adhesion layer, which itself may be a $\beta$-Ta layer, and the $\beta$-Ta underlayer. The magnetic recording disk according to this invention has a magnetic layer for vertical recording with substantially improved perpendicular magnetic anisotropy, increased perpendicular coercivity and reduced horizontal coercivity over prior art CoCr or CoCrTa vertical recording disk structures.

For a fuller understanding of the nature and advantages of the present invention, reference should be made to the following detailed description taken in conjunction with the accompanying drawings.

BRIEF DESCRIPTION OF THE DRAWINGS

FIG. 5 is a hysteresis loop of a typical magnetic layer on a disk made according to this invention.

DESCRIPTION OF THE PREFERRED EMBODIMENTS

The beta phase of tantalum is a metastable phase which converts to the normal body centered cubic (bcc) phase at approximately 750° C. It is characterized by a film resistivity of 180–200 $\mu\Omega$ cm., as compared to a film resistivity of 30 $\mu\Omega$ cm. for the normal bcc phase of Ta. The beta phase of tantalum is stabilized by the crystalline and chemical properties of the substrate. It is believed that $\beta$-Ta can only be formed on a substrate which contains oxygen or is capable of forming a surface oxide. Earlier studies of $\beta$-Ta had indicated that it may have a tetragonal crystalline structure. More recent studies indicate that the atoms in the $\beta$-Ta film are deposited in layers and within each layer the unit cells are packed in a hexagonal array, the unit cell having 144 atoms and lattice constants of a=2.831 Angstroms and c=5.337 Angstroms. A more detailed description of the properties of $\beta$-Ta is given in *Tantalum Thin Films*, W.D. Westwood, et al, Academic Press (1975), pp. 76–88.

The unique property of $\beta$-Ta as an underlayer in a disk for vertical recording is the high degree of preferred orientation, i.e. a strong [00.2] fiber axis. The use of $\beta$-Ta as an underlayer and the incorporation of relatively small amounts of Ta in the CoCrTa magnetic layer result in a vertical magnetic recording medium in which the magnetic layer has substantially improved C-axis orientation, substantially increased perpendicular coercivity, and substantially decreased horizontal coercivity.

Thin film disks according to the present invention were fabricated using a Varian S-gun sputtering apparatus with CoCr, NiFe and Ta targets. The disks used silicon substrates which were cleaned of their native oxide either by the conventional methods used in semiconductor fabrication or by glow discharge cleaning in the sputtering chamber. While silicon was used, other substrate materials compatible with the formation of $\beta$-Ta are glass and polyimide, such as that available from E. I. DuPont De Nemours and Company under the trademark KAPTON.

The $\beta$-Ta underlayer and the CoCrTa magnetic layer were deposited successively in a single pump down of the sputtering chamber. The base pressure in the sputtering chamber was maintained at $10^{-7}$ Torr and the Argon pressure was approximately $2 \times 10^{-3}$ Torr.

Figure 1:
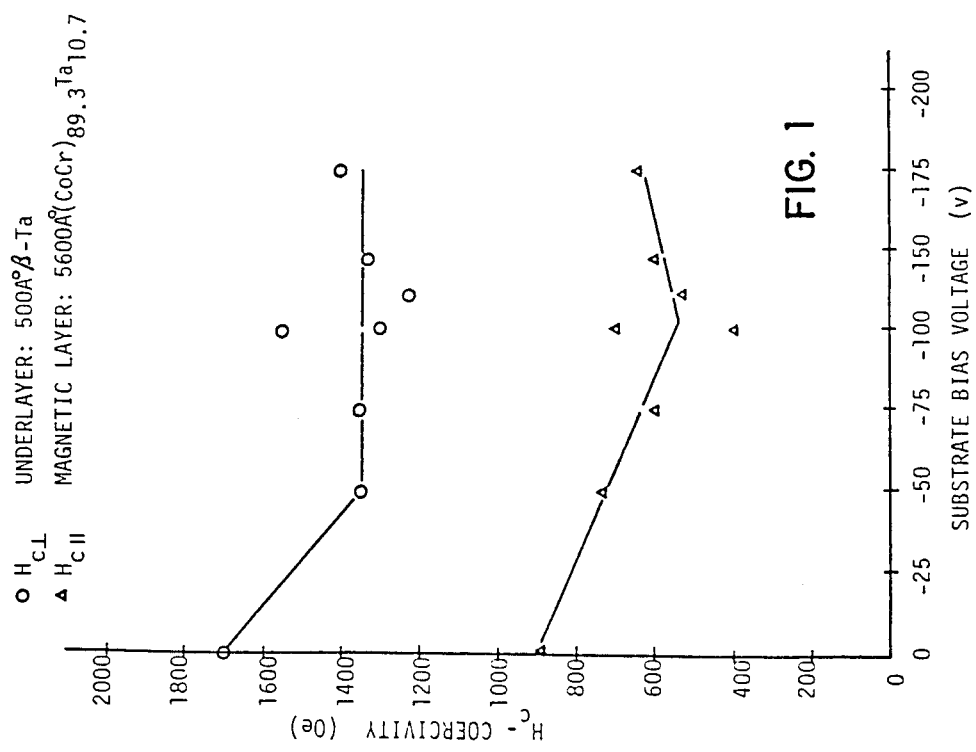
FIG. 1 is a graph of coercivities of the magnetic layer of disks made according to this invention as a function of substrate bias voltage (bias sputtering)

Under these conditions a film of $\beta$-Ta was first deposited on a silicon substrate with no bias voltage applied to the substrate. Additional disks were then made by maintaining the sputtering conditions the same with the exception that a negative bias voltage was applied to the substrate. In each case the $\beta$-Ta was deposited to a thickness of 500 Angstroms after which a film of CoCrTa having a Ta concentration of about 10.7 atomic percent (at.%) was deposited to a thickness of 5600 Angstroms. In FIG. 1, the perpendicular and horizontal coercivities of the CoCrTa film are plotted as a function of the negative bias voltage applied to the substrate. The purpose of the substrate bias voltage is to preferentially remove adsorbed residual gas impurities, thus preventing their incorporation into the growing film.

Figure 2:
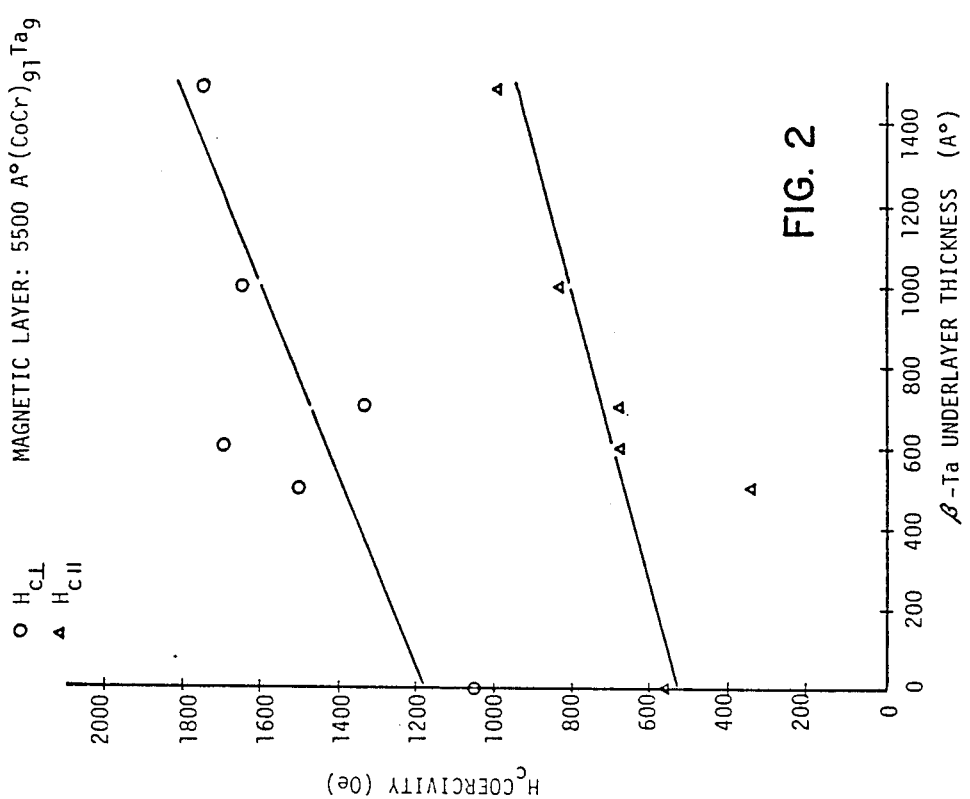
FIG. 2 is a graph of coercivities of the magnetic layer of disks made according to this invention as a function of the thickness of the $\beta$-Ta underlayer.

The perpendicular and horizontal coercivities of the CoCrTa film are also a function of the thickness of the $\beta$-Ta underlayer. Disks were made maintaining all parameters constant with the exception of the thickness of the $\beta$-Ta underlayer. The thickness of the CoCrTa layer was 5500 Angstroms with a Ta concentration of about 9 at.%. The dependence of the coercivities of the CoCrTa film upon the thickness of the $\beta$-Ta underlayer is illustrated in FIG. 2.

Figure 3:
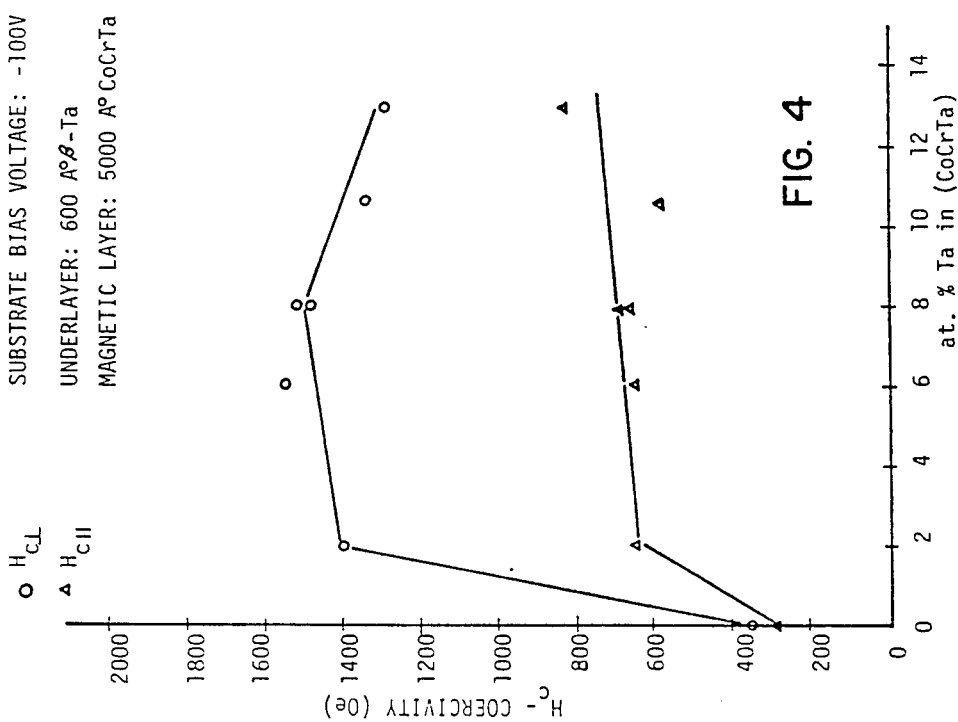
FIG. 3 is a graph of coercivities of the magnetic layer of disks made according to this invention as a function of thickness of the CoCrTa layer.

Disks of different thickness for the CoCrTa magnetic layer were also made. The dependence of the coercivities on the CoCrTa film thickness is shown in FIG. 3 for disks in which the $\beta$-Ta underlayer was 600 Angstroms thick and was deposited at a bias voltage on the substrate of $-100$ volts. The Ta concentration in the CoCrTa magnetic layer was about 10 at.%. Disks have been made according to the present invention with a CoCrTa layer as thin as 1500 Angstroms without any substantial degradation in magnetic properties as a vertical recording medium.

Figure 4:
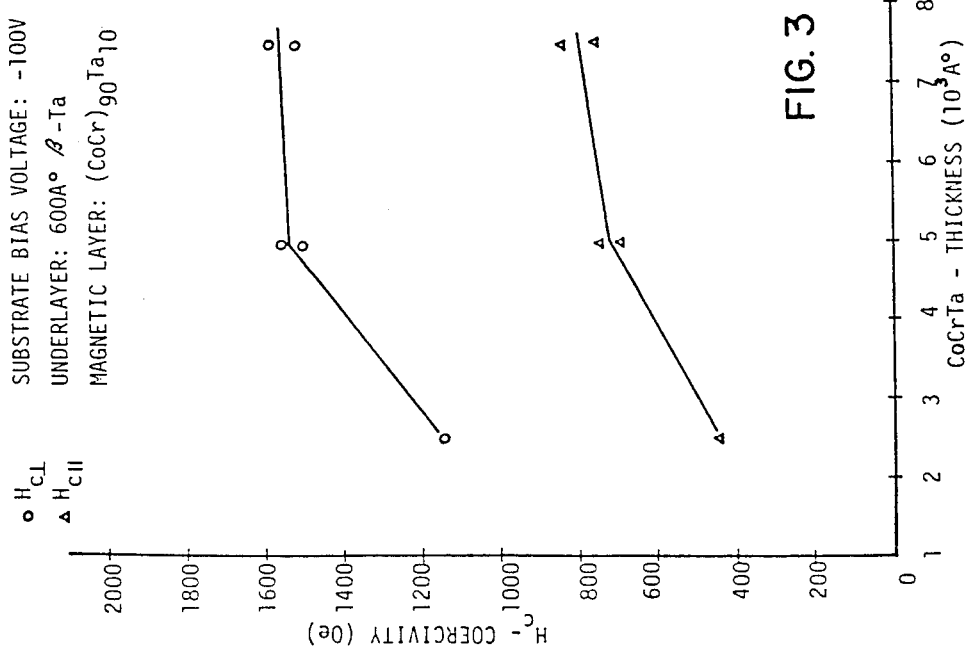
FIG. 4 is a graph of coercivities of the magnetic layer of disks made according to this invention as a function of the concentration of Ta in the CoCrTa layer.

The improved coercivities of the disks made according to the present invention also require that a certain amount of tantalum be present in the magnetic layer. As shown in FIG. 4, for disks with CoCrTa magnetic layers deposited over 600 Angstroms $\beta$-Ta films deposited at a $-100$ V. substrate bias voltage, there is a substantial improvement in coercivities of the CoCrTa film when the Ta concentration is increased above approximately 2 at.%.

In alternative embodiments of the present invention, disks were made which incorporated a NiFe soft magnetic layer in a thickness of 2500–7500 Angstroms to provide a magnetic flux return path. In one such embodiment, the NiFe was deposited on the silicon substrate, after which the $\beta$-Ta and CoCrTa layers were sputter-deposited as described above. In another embodiment the NiFe layer was deposited between intermediate layers of $\beta$-Ta. In this embodiment, the $\beta$-Ta layer between the silicon substrate and the NiFe layer served merely as an adhesion layer for the NiFe. Other materials, such as Cr or Ti, would also serve as such an adhesion layer. The presence of the NiFe layer had no effect upon the coercivities or the C-axis orientation of the CoCrTa magnetic layer in either of these embodiments which incorporated the NiFe layer.

The C-axis dispersion, $\Delta\theta_{50}$, was measured at about $2°$ for 5000 Angstrom $(Co_{85}Cr_{15})_{90}Ta_{10}$ films deposited on 500 Angstrom $\beta$-Ta underlayers. A vibrating sample magnetometer (VSM) scan of such films showed $H_{c\perp} = 1500$ Oe and $H_{c\|} = 350$ Oe, as shown in FIG. 5.

In all disks made according to the present invention the CoCr target had the composition of either $Co_{85}Cr_{15}$ or $Co_{86}Cr_{14}$. However, the same excellent results can be obtained if the cobalt comprises approximately 80–86 at.% of the CoCr present in the CoCrTa magnetic layer.

The specific means by which the improved coercivities and C-axis dispersion is accomplished with the use of the $\beta$-Ta underlayer and the incorporation of Ta in the magnetic layer is not fully understood. However, the highly preferred orientation of the hexagonal $\beta$-Ta film may provide a highly oriented nucleation layer which increases the orientation of the crystalline structure of the CoCrTa layer. The resulting reduction in C-axis dispersion may account for the relatively high value of $H_{c\perp}$. It is also possible that the $\beta$-Ta underlayer orients the CoCrTa through lattice matching, although the difference in the lattice constants between the crystalline cells of the two films is approximately 8 to 12%.

As indicated previously, the formation of $\beta$-Ta is determined through a large extent by the substrate properties. In order to form $\beta$-Ta, the substrate must be oxidizable or contain oxygen. Also, the presence of impurities in the sputtering chamber is critical and can prevent the proper formation of $\beta$-Ta. For that reason it is important that the ultimate pressure in the sputtering chamber be in the low $10^{-7}$ Torr range.

While the disks made according to the present invention utilized a magnetic film having perpendicular magnetic aniostropy which included small percentages of Ta with the CoCr, it is possible that other elements may be substituted in place of Ta to provide similar results. For example, titanium (Ti), niobium (Nb), molybdenum (Mo), and tungsten (W) all possess atomic radii similar to that of tantalum and may possibly be incorporated in relatively small percentages in the CoCr film to produce magnetic films having improved C-axis dispersion and perpendicular and horizontal coercivities.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic recording disk for vertical recording comprising a film of beta-tantalum ($\beta$-Ta) on a suitable substrate and a magnetic film of an alloy including cobalt and chromium according to the formula $(CoCr)_yX_{100-y}$ on the $\beta$-Ta film, wherein the alloy is of hexagonal crystalline structure with its C-axis oriented generally perpendicular to the substrate, wherein the amount of element X in the alloy is greater than approximately 2 atomic percent, and wherein the element X is selected from the group consisting of Ti, Nb, Mo, Ta, and W.

2. The disk according to claim 1 wherein the suitable substrate further comprises a substrate having a film of nickel-iron (NiFe) alloy deposited thereon to provide a magnetic flux return path.

3. The disk according to claim 1 wherein the suitable substrate is silicon.

4. The disk according to claim 1 wherein the β-Ta film is a β-Ta film sputter-deposited on the substrate while a bias voltage is applied to the substrate.

5. The disk according to claim 1 wherein the suitable substrate further comprises a substrate having a nickel-iron (NiFe) compatible adhesion film deposited thereon and a film of nickel-iron (NiFe) deposited on the adhesion film.

6. The disk according to claim 5 wherein the adhesion film is β-Ta.

* * * * *